H. D. POWNALL.
ICE MACHINE.
APPLICATION FILED MAR. 9, 1912.

1,180,534.

Patented Apr. 25, 1916.
2 SHEETS—SHEET 2.

Witnesses
B. R. Kropf
Vera Gott

Inventor
Henry D. Pownall
By C W Miles
Attorney

UNITED STATES PATENT OFFICE.

HENRY D. POWNALL, OF CANTON, OHIO.

ICE-MACHINE.

1,180,534.  Specification of Letters Patent.  Patented Apr. 25, 1916.

Application filed March 9, 1912. Serial No. 682,580.

*To all whom it may concern:*

Be it known that I, HENRY D. POWNALL, a citizen of the United States, residing at Canton, in the county of Stark and State of Ohio, have invented certain new and useful Improvements in Ice-Machines, of which the following is a specification.

My invention relates to improvements in ice machines.

One of its objects is to provide an improved brine cooler and brine tank and system of brine circulation.

Another object is to provide an improved brine cooler adapted to be operatively connected with a plurality of independent brine tank units.

Another object is to provide for independent control of the brine circulation from the cooler to the respective brine tanks or brine tank units, and for supplying warmer brine to the respective brine tanks or units to release the ice from the molds.

Another object is to provide for a supply of cooled brine to the several brine tank units, a uniform circulation of brine through the several brine tank units, and a certain and quick return of the warmer brine from the brine tank units to the brine cooler.

Figure 1:
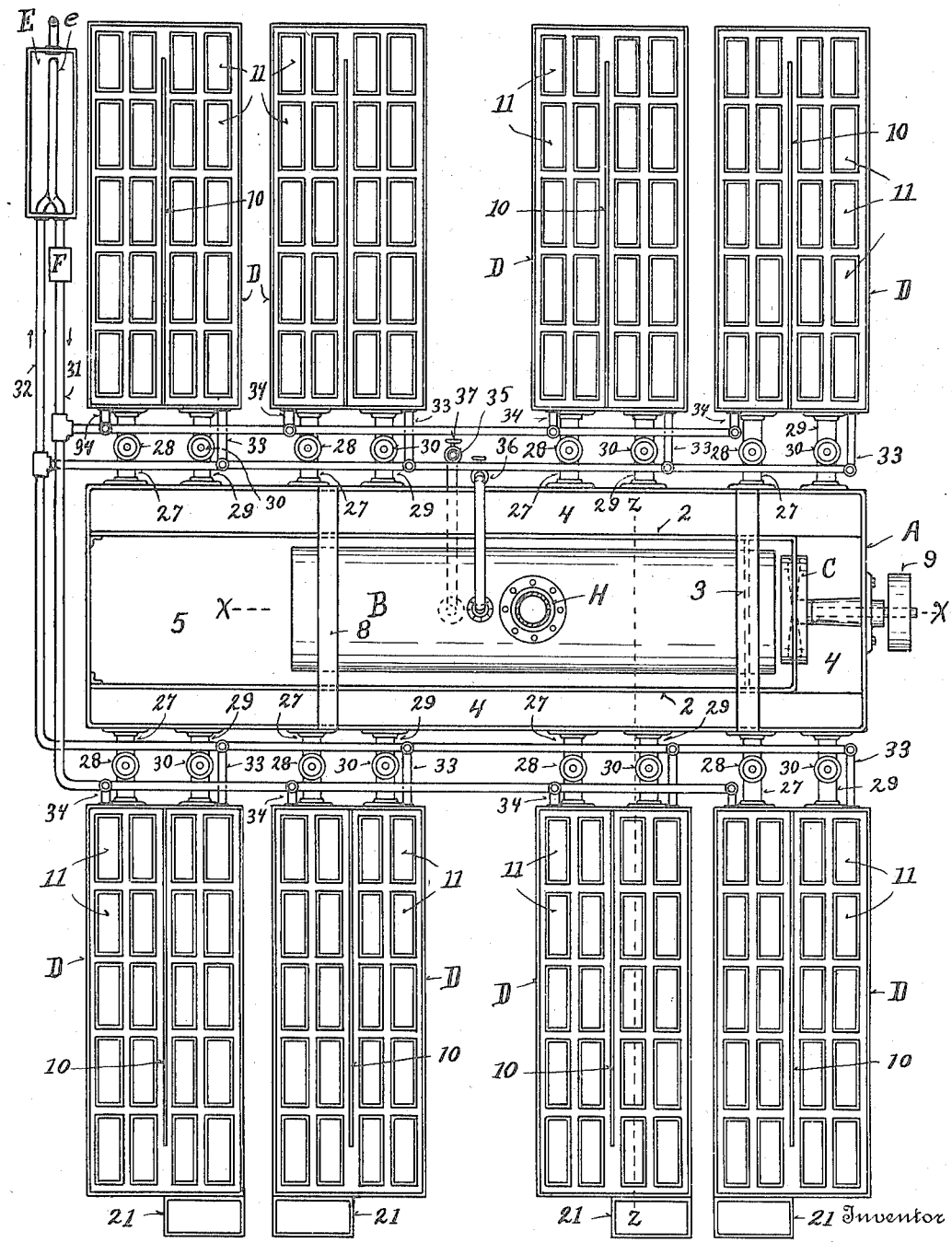
Figure 2:
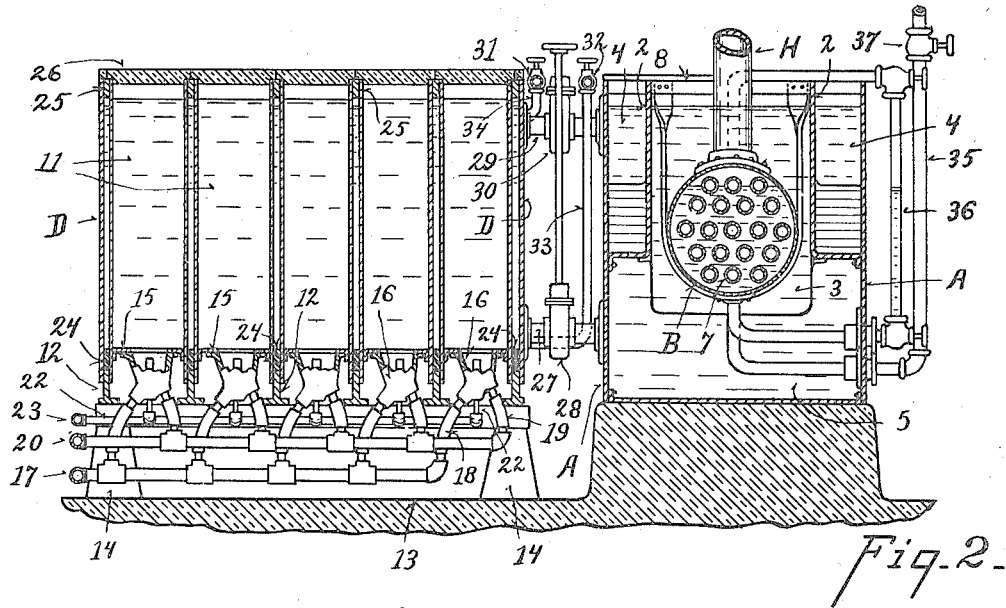
Figure 3:
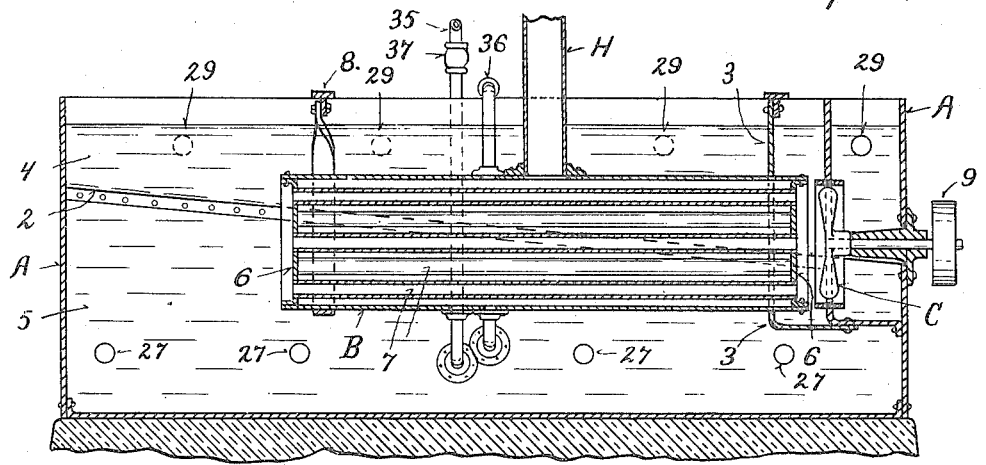
Figure 4:
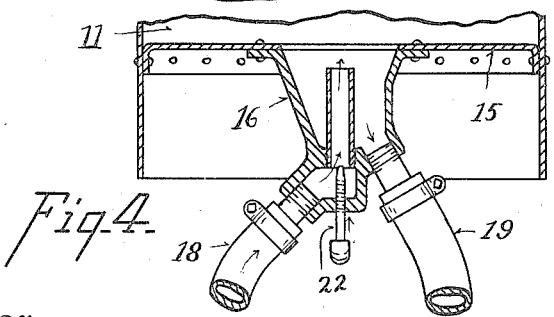

My invention further consists in certain details of form, combination and arrangement, all of which will be fully set forth in the description of the accompanying drawings, in which:

Figure 1 is a top plan view of my improved brine cooler and brine tank system and connections. Fig. 2 is a vertical section on line $z$ $z$ of Fig. 1, through the brine cooler and one of the brine tanks with the settling tank omitted. Fig. 3 is a vertical section on line $x$ $x$ of Fig. 1, through the brine cooler. Fig. 4 is an enlarged detail partly in section, showing the lower portion of one of the ice molds and its connections.

The accompanying drawings illustrate one of the preferred embodiments of my invention, in which the brine cooler comprises a tank A divided by partitions 2 and 3 into two compartments. One of said compartments 4 is preferably in the form of a trough extending along the upper portion of the sides and across one end of the tank A. This trough or compartment 4 is designed to receive the warm brine returning from the several brine tank units and to keep it separate from the cooled brine until after it has itself been subjected to the cooling action of the brine cooler. Another compartment 5 of the tank A comprises the central upper portion and practically all of the lower portion of tank A, and is designed to receive the cooled brine after passing through the brine cooler proper, or brine cooling member, and to conduct the cooled brine to the respective brine tank units. The brine cooling member consists of a cylindrical shell B having heads 6 at opposite ends, and a series of tubes 7 passing through the shell B and connected at opposite ends to the heads 6, through which tubes the brine flows on its passage from compartment 4 to compartment 5. The shell B is exteriorly immersed in the brine in tank A, and one end passes through an opening in partition 3, which serves to support the shell B at one end, said shell being supported at the opposite end by a strap hanger from a T-bar 8 resting across the top of the tank.

C represents a propeller or mechanical circulator driven by means of a belt on pulley 9 to force the brine with the desired potential from compartment 4 through the tubes 7 to the compartment 5 and thence through the brine tank units and back to the compartment 4.

The brine tank is divided into a series of independent units each of which comprises a brine tank D having one or more partitions 10 to cause the brine to flow in a loop shaped path through said tank, and a series of ice molds 11. The ice molds are preferably permanently located in the tank, and adapted to have fresh water supplied thereto and the ice removed in the following manner. The side walls of the tank and ice molds are attached at their lower edges to a frame work 12 of T-bars which in turn is supported above the floor 13 by means of blocks or piers 14, so as to give access beneath the tank. The bottoms 15 of the respective molds are located some distance above the lower edges of the side walls of said molds forming chambers beneath the respective ice molds and above the lower edges of the T-bars. Coupling members 16 connected to the bottoms of the respective ice molds provide for the circulation of fresh or raw water from the main pipe 17 to the respective ice molds by means of branch pipes 18, with a return flow by branches 19 to main pipe 20, said main pipes 17 and 20 being preferably connected to settling reservoirs 21 to and from which the fresh water flows from the ice molds, and in which any sediment carried from the ice molds is designed to be deposited. A regulated supply of air under pressure is adapted to be furnished by main pipe 23 and branch pipes 22 to the respective ice molds to agitate the water therein and to promote a circulation of the fresh water to and from the molds.

A body of pitch 24 or similar material is filled into the lower portion of tanks D surrounding the ice molds and to about the height of the bottoms of said molds, which body of pitch serves as water-proof and non-conducting floors for the tanks, prevents contact of the cold brine with the side walls of the chambers beneath the ice molds, and effectually seals the joints at the lower edges of the tanks and molds. The upper edges of the ice molds are preferably supported in position by means of sills and cross-sills 25 which form a non-conducting cover for the brine in the tanks D and also as supports for the lids 26 which normally cover the ice molds.

Each of the tanks D is connected near the bottom with compartment 5 of the cooler tank A by means of a pipe 27 controlled by a valve 28, and each tank D is connected near its upper edge with the compartment 4 of the cooler tank A by a pipe 29 controlled by a valve 30. When said valves 28 and 30 of the respective brine tank units are open and the circulator C is in operation, the cold brine from the lower portion of compartment 5 flows into the tank or tanks D and after circulating among the ice molds and around the partition 10 during which period its temperature rises, it finally rises and flows out of the tank D through the pipe 29 and enters compartment 4 of tank A, from which it is forced by the circulator C through the tubes 7 and cooled and returned to compartment 5 ready for another cycle of operation.

It will be noted that the circulator tends to maintain a uniform difference of potential or head in compartment 5 of tank A ready to feed the cooled brine to any or all of the brine tank units, and to provide for a uniform supply and flow of brine to such of said units as have their valves 28 and 30 open, and for a low resistance and rapid flow of brine through the brink tank units, thus as far as is practical maintaining all of the brine close to a uniform temperature, which results in a practically uniform freezing action in all the ice molds.

E represents a tank containing fresh or raw water to be cooled and then used in filling the ice molds. In said tank is a coil of pipe $e$ through which brine is to be circulated to cool the fresh water in said tank and to raise the temperature of the brine passing through said coil. Main supply and return pipes 31, 32 connected to coil $e$ and provided with valve controlled branch pipes 33, 34 connected to the respective brine tank units provide for circulating brine from any one of the brine tank units through coil $e$ and back to said brine tank unit. When the ice is ready to be withdrawn from the molds of any brine tank unit, its valves 28 and 30 are closed cutting off its circulation of brine to and from the brine cooler tank, the valves of its branch pipes 33, 34 are opened and a circulating pump F started, which circulates brine from said brine tank unit through coil $e$ where due to the warmer fresh water in tank E, the temperature of the brine is raised. The warmer brine is then returned to said brine tank unit, and shortly the temperature of all the brine in said brine tank unit has been raised sufficiently to release the blocks of ice in all of its molds; whereupon circulation of brine to the coil $e$ is cut off and the ice removed from the molds, and the molds refilled with raw water from tank E which has just been cooled, and said brine tank unit is ready to again commence the freezing operation. The brine capacity of coil $e$ may be small compared with that of the brine tank unit, and the application of warmer brine to the exterior of the molds being somewhat gradual prevents any tendency to crack or split the ice blocks due to rapid local change of temperature.

A quantity of refrigerant in liquid state is admitted to the shell B through a valve controlled supply pipe 35 so as to nearly fill said shell and to surround the tubes 7. A liquid level gage 36 enables the height of the liquid refrigerant in shell B to be observed and regulated by means of the regulating valve 37 in pipe 35.

H represents a pipe by means of which the gaseous refrigerant is conducted from the shell B to a compressor or absorber.

The arrangement of the cooler and brine tank units is such as to permit access to all parts of the several units and members, and to provide for connection with a minimum amount of piping. In practice the exterior of the cooling tank and brine tank units except at the bottom are provided with insulating covering, which is not shown in the drawings.

The mechanism herein illustrated and described is capable of considerable modification without departing from the principle of my invention.

Having described my invention, what I claim is:

1. In an ice machine a brine cooler tank divided by a partition into two compartments, a brine cooler member located in said tank in position to be immersed in the brine of said tank and to contact with the brine in its passage from one to the other of said compartments, a plurality of independent brine tank units each located adjacent to said brine cooler tank and connected to its respective compartments by independent valve controlled delivery and return conduits, and mechanism to cause the brine to flow through said brine cooler tank from one compartment to the other and by separate paths through said brine tank units and return to said brine cooler tank.

2. In an ice machine, a brine cooler comprising a tank having a brine storage and delivery compartment provided with a plurality of valve controlled delivery conduits leading therefrom, a trough shaped brine receiving compartment located at the sides and upper portion of said tank and provided with a plurality of valve controlled brine receiving conduits leading thereto, a brine cooling member located in said tank and with which the brine contacts in passing from one of said compartments to the other, and means to cause a flow of brine from one of said compartments to the other.

3. In an ice machine, a brine cooler comprising a tank having a brine delivery compartment provided with a plurality of valve controlled brine delivery conduits located in position to take the cooler portions of brine from said compartment, a brine cooling member located in said tank and adapted to be immersed in the brine of said tank, and forming a brine passage leading to said delivery compartment, and a brine receiving compartment located in the upper portion of said tank and provided with a plurality of brine receiving conduits, said receiving compartment serving to deliver the brine from said brine receiving conduits to said brine cooling member, and said brine delivery and receiving conduits being adapted to be employed in pairs to maintain independent brine circulating systems.

4. In an ice machine a brine container constituting the chief brine containing receptacle and having a brine receiving compartment and a brine distributing compartment, a brine cooler in position to be immersed in the brine of said container and through which the brine flows from one of said compartments to the other, means to create a difference of potential in brine in said respective compartments tending to cause the brine to circulate from one compartment to the other, a plurality of independent brine tank units each connected to one compartment of said container by an independent valve controlled supply conduit and to the other compartment of said container by an independent valve controlled return conduit to enable a substantially uniform circulation of brine to be independently and selectively maintained through said respective brine tank units.

5. In an ice machine, a brine cooler tank divided by a partition into two compartments, a main storage and discharge compartment occupying the lower portion of said tank and a brine receiving compartment located at the upper portion of said tank, a cooling member located in said tank and with which the brine contacts in passing from one of said compartments to the other, and a plurality of independent brine tank units each separately connected by valve controlled conduits with said respective compartments of the cooler tank, and means to cause a circulation of brine through said cooler tank and one or more of said brine tank units.

6. In an ice machine, a brine cooler tank divided by a partition into two compartments, one serving as a storage and delivery compartment occupying the lower portion of said tank and the other serving as a brine receiving compartment and located at the upper portion of said tank, a brine cooling member located in said tank in position to contact with the brine in its passage from one of said compartments to the other, a plurality of independent brine tank units each separately connected by valve controlled conduits with said delivery compartment of the cooler tank and each separately connected by conduits with the receiver compartment of said cooler tank, and means to cause a circulation of brine through said cooler tank and by separate paths through a plurality of said brine tank units and return to said cooler tank.

7. In an ice machine, a brine cooler comprising a tank divided into a brine delivery compartment having a brine delivery conduit leading therefrom, a brine receiving compartment located at one side and at the upper portion of said tank and having a brine receiving port leading thereto, a brine cooling member located in said tank and with which the brine contacts in passing from one of said compartments to the other, and means to cause a flow of brine from one of said compartments to the other.

In testimony whereof I have affixed my signature in presence of two witnesses.

HENRY D. POWNALL.

Witnesses:
C. W. MILES,
E. W. McCALLISTER.